United States Patent [19]

Wong

[11] 4,150,400
[45] Apr. 17, 1979

[54] METHODS OF A COARSE-SCAN/FINE-PRINT CHARACTER REPRODUCTION WITH COMPRESSION

[75] Inventor: Kwan Y. Wong, San Jose, Calif.

[73] Assignee: International Business Machines Corporation, Armonk, N.Y.

[21] Appl. No.: 783,374

[22] Filed: Mar. 31, 1977

[51] Int. Cl.² .................... H04N 7/12; H04N 1/00
[52] U.S. Cl. ............................... 358/260; 358/261; 358/133; 358/138
[58] Field of Search ............... 358/260, 261, 133, 138

[56] References Cited

U.S. PATENT DOCUMENTS

| | | | |
|---|---|---|---|
| 3,462,547 | 8/1969 | Macovski | 358/133 |
| 3,977,007 | 8/1976 | Berry | 346/75 |
| 3,980,809 | 9/1976 | Cook | 358/260 |
| 4,032,978 | 6/1977 | Wong | 358/283 |

Primary Examiner—Robert L. Griffin
Assistant Examiner—Edward L. Coles
Attorney, Agent, or Firm—James A. Pershon

[57] ABSTRACT

A coarse scanning device produces analog signals that are encoded and compressed to distinguish between and represent the white background and potentially the all black elements of the character by run length codes and at least the edge of the black character by grey level values. The grey level information is decoded to activate a fine print device where the numer of print dots in a matrix is equal to the grey level values. The placement of the print dots are biased according to pattern matrices designed to bias the dots toward the character. The pattern matrices are acquired by determining the sums of the grey level values of various groups of picture elements peripheral to the picture element being decoded.

16 Claims, 16 Drawing Figures

| SCAN PEL | LINE F | LINE K |
|---|---|---|
| 1 | 0 | 0 |
| 2 | 0 | 0 |
| 3 | 0 | 1(8) |
| 4 | 0 | 1(16) |
| 5 | 1(12) | 1(8) |
| 6 | 1(16) | 0 |
| 7 | 1(16) | 0 |
| 8 | 1(12) | 1(8) |
| 9 | 1(1) | 1(16) |
| 10 | 0 | 1(10) |
| 11 | 0 | 0 |
| 12 | 0 | 0 |

METHODS OF A COARSE-SCAN/FINE-PRINT CHARACTER REPRODUCTION WITH COMPRESSION

CROSS REFERENCE TO RELATED APPLICATIONS

The Description of the Preferred Embodiment of this Patent Application contains a description of an invention relating to a Patent Application filed on the same date as the present invention Ser. No. 783,375, filed on Mar. 31, 1977 by K. Y. Wong and B. R. Schatz and entitled "Method for Improving Print Quality of a Coarse-Scan/Fine-Print Character Reproduction."

BACKGROUND OF THE INVENTION

This invention relates generally to a data packing control for message transmission and, in particular, to the compaction of graphic data by run length encoding using control digits for image reproduction.

1. Field of the Invention

In a facsimile communication system, images comprising black characters on a white background are usually transmitted to a reproducing system such as a cathode ray tube, light emitting diodes or such display device, or a dot printer such as an ink jet or wire printer. Generally, the scanned data is encoded into a compressed form before data transmission to permit faster transmission to the display reproduction device. At the receiver end, a suitable decompression scheme is used to recover the original data.

To obtain a high quality reproduction of the original characters, generally a fine scan device and a fine reproduction device are used. Thus, for high quality reproduction, the characters are generally scanned at, for instance, 720 picture elements per inch and reproduced at the same picture element rate. This produces a very good reproduction of the original character. However, this high number of picture elements at the scanning device forces the storage of many bits of information even with compression schemes since many picture elements must still be converted to a binary data information for transmission.

In order to decrease the scanning and storage complexity, the characters were generally scanned at a coarse scanning rate of, for instance, 180 picture elements per inch and printed or reproduced at the same coarse level. At this coarse scan level, less memory storage and lower data rate transmission can be used. However, the print quality is low and includes a large number of noticeable staircases that are unacceptable to an observer.

It is, therefore, an important object of the present invention to provide a process for the transmission of character data that includes the compaction of the graphic data in combination with grey level representation that permits the use of a coarse scanning device together with a fine reproduction device to accomplish an enhanced character scan transmission and reproduction.

2. Description of the Prior Art

It is known that compaction of graphic data can be accomplished by using run-length encoding with binary numbers corresponding to various blocks of data while using characterized control digits to switch between the black and the white background information. U.S. Pat. Nos. 3,483,317 to DeGroat and 3,643,019 to Beltz disclose such systems. The DeGroat Patent teaches the use of control digits to switch from run length coded data to black and white data information for reproduction. The Beltz Patent teaches the use of a number of bytes in a pattern as being dependent on the length of the segments. One bit determines the beginning and end of the segments. However, no known prior art teaches the combination of the compaction of graphic data while using a control digit to switch between character and background information in combination with a representation of the grey level values for the graphic character representation.

Another object of the present invention, therefore, is to provide an enhanced data compaction scheme that includes a grey level representation.

Further, the prior art character scanning, transmission and reproduction schemes permitted only a coarse reproduction of coarsely scanned data or, if a better quality reproduction was desired, a fine reproduction of a finely scanned character. There is no showing in the prior art of the use of a data compaction scheme that permits the high quality fine reproduction device of a coarsely scanned character signal that includes graphic data compaction with a grey level representation that can be decompressed and decoded to permit the fine high quality reproduction with very little loss of resolution.

Yet another object of the present invention, therefore, is to provide a character reproduction process that provides a fine reproduction from a coarse scan.

SUMMARY OF THE INVENTION

In accordance with the present invention, a data compression scheme for use with a coarse scanning device to accomplish a fine character reproduction encompasses a run length code representing the background information or runs of all white or all black data with the character or at least the edge information represented as grey levels. Control bits are used to distinguish between the run length information and the grey value information. The remaining bits of each byte represent the length of the run length code and the grey levels of the picture elements comprising the character. This coding of the graphic data permits decompaction of the data information into a higher resolution reproduction device expanded by the grey level infortion.

Further in accordance with the present invention, a reproduction process for a scanned picture comprises the steps of coarsely scanning a picture element of the picture where the picture elements are identified according to a numerical level value from white to grey to black, where the numerical value of grey to black is equal to from 1 to N. The picture elements are reproduced in a fine level reproducer where each coarsely scanned picture element is reproduced in an A×B matrix of reproduction dots. The white picture element activates no reproduction dots and a grey to black picture element activates the number of reproduction dots in the matrix according to its numerical value from 1 to N, where the product of A×B is equal to N. The numerical value can be from grey to white with a numerical value of 1 to N where the background is dark and the reproduction dots are activated to produce levels of grey to white.

The total process for picture reproduction according to the present invention includes the steps of coarse scanning a picture element, identifying the coarsely scanned picture element according to a level from white to grey to black, compressing and encoding common level picture elements, obtaining and encoding grey level values for picture elements identifying at least the black to white edge of the picture, storing the encoded data if necessary for transmission to a reproducing device, transmitting the data, receiving the data, storing the received data, decoding the stored data, decompressing the compressed data, decoding the grey level data, setting the number of reproducing dots according to the grey level data, and reproducing the picture according to the decompressed data and the reproduction dots set.

An object of the present invention, therefore, is to provide an enhanced character reproducing process.

Another object of this invention is to provide an enhanced encoding and decoding scheme that permits coarse scanning and fine reproduction of the characters.

Yet another object is to provide method of reproducing a character that produces high quality character images with high resolution while permitting a coarse scanning, data compression and data transmission of the character to be reproduced.

These and other objects of this present invention will become apparent to those skilled in the art as the description proceeds.

BRIEF DESCRIPTION OF THE DRAWING

The various novel features of this invention, along with the foregoing and other objects as well as the invention itself both as to its organization and method of operation, may be fully understood from the following description of illustrated embodiments when read in conjunction with the accompanying drawing, wherein.

GENERAL DESCRIPTION OF A PREFERRED EMBODIMENT

According to the present invention, characters scanned according to large scanning areas can be enhanced at the reproduction device by using a grey level scale to operate a group of smaller area dots. The total dot area controlled by a grey level scale reproduces the scanned area. A compression scheme is disclosed for decreasing the data transmission while retaining the grey scale information.

Characters to be reproduced can be coarsely scanned into a binary data representation and directed to a compression processor where the data is compressed and the character information is identified according to a grey level scale. The information is stored and then placed onto transmission lines to a decompression processor when needed. The digital information is decoded and directed to a fine level reproducer where the grey scale information is used to expand each coarsely scanned picture element to fill reproduction matrices. The coarse scan/fine print concept can use several schemes to print the individual dots properly for print enhancement.

DESCRIPTION OF A PREFERRED EMBODIMENT

Figure 1:
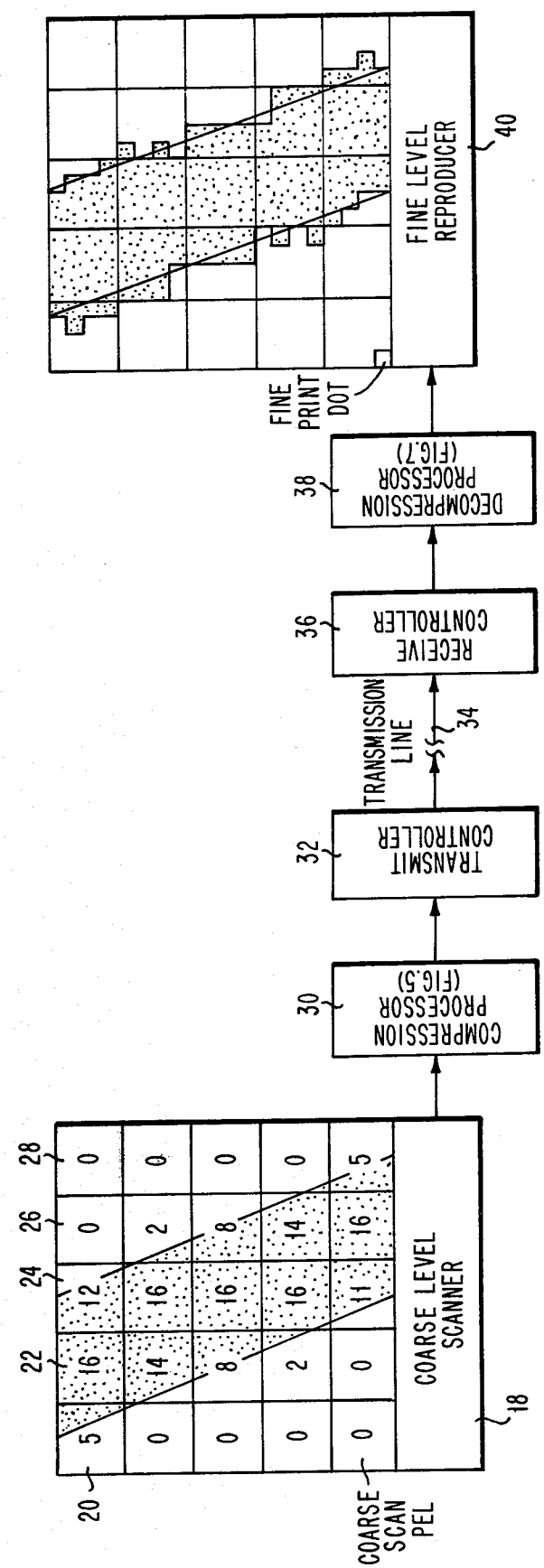
FIG. 1 is a block diagram of a system illustrating the coarse scan to fine reproduction of the present invention.

Referring to FIG. 1, the character is coarsely scanned in a coarse level scanner 18 to produce white level or background information and grey level or character information in each scanned picture element or pel. In the preferred embodiment, the grey level scale comprises 16 possible grey level scales. In the first row of a coarse scan, the first pel 20 has five sixteenths of the pel covered by the character. In the second pel 22 of the first row the character covers the entire block and thus is all black with a grey level of 16. The third pel 24 has a grey level scale of 12 out of a possible 16 and thus the grey level scale is 12. Fourth and fifth pels 26 and 28 of the coarse scan has only background information and thus the picture element is identified as a white level which could be stated to be a grey level of 0.

The coarse scan information from the coarse level scanner 18 according to the selected levels are directed to a compression processor 30. In the compression processor 30, the picture element is identified whether background or character information. Sequenced information is run length encoded and stored accordingly. The character or edge information is identified and is encoded according to the grey scale information, the 1-16 grey scale levels of the preferred embodiment. Each coarsely scanned picture element is separately encoded and stored. When ready, the scanned information is directed to a transmit controller 32 for placement on a transmission line 34, for instance.

The binary data information is received by a receive controller 36 and directed to a decompression processor 38. The decompression processor 38 decodes the received binary data information to separate the run length encoded information from the character or edge information according to the grey level scale. The background information and the character information, as represented by the grey level, controls a fine level reproducer system 40 according to a single directional biasing scheme to bias the grey level reproduction dots toward the side of the surrounding coarsely scanned block having the largest number of dots. The coarse level scanning together with the processing of the data information according to a data compression procedure and the grey level character encoding permits a high speed transmission of the binary encoded character. The fine level precision reproducer with the decompression process and the single directional biasing scheme permits a high quality character reproduction.

Figure 2:
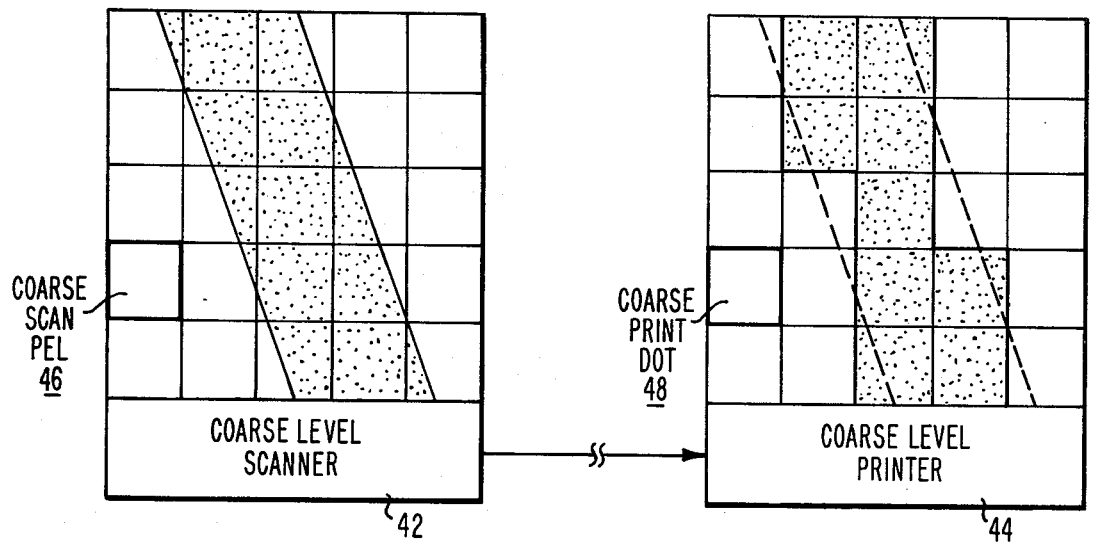
FIG. 2 depicts a representation of the prior art for a coarse scan and coarse print process.
Figure 3:
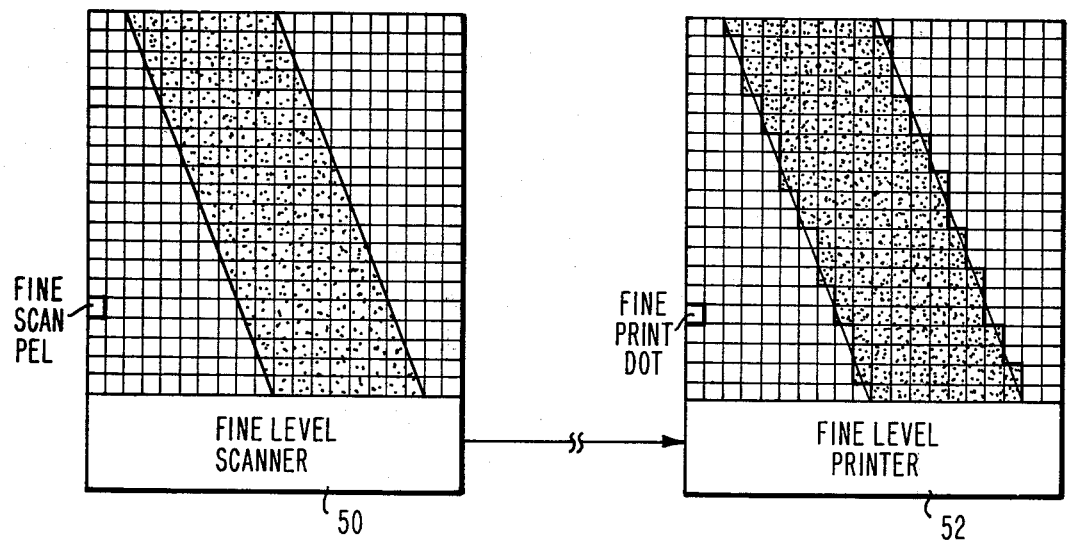
FIG. 3 shows a representation of the prior art for a fine scan and fine print process.

In order to show the advantage of a coarse scan and fine print together with the disclosed biasing scheme, reference is made to FIGS. 2 and 3 which disclose representations of the prior art systems. In FIG. 2 is shown a character reproduction system using a coarse level scanner 42 and a coarse level printer 44 of the prior art. A coarse scan pel 46 and a coarse print dot 48 as shown represents the area covered by a single scan position and a single print position, respectively. The coarse scan has the advantage that a lower amount of data is produced in a scanning operation and thus speed and ease of transmission is accomplished since a relatively small amount of information is obtained. Generally, the process of the prior art is such that a black or character element portion is printed if the character covers more than 50% of the area within the scanned picture element. The resulting character as shown in the coarse level printer 44 is only a rough representation of that originally scanned. The staircase portion of the character has proven to be objectionable to an observer. According to the prior art, for better print quality and resolution the fine scan and fine print process as shown in FIG. 3 was used.

A fine scan picture element of a fine level scanner 50 of FIG. 3 is substantially smaller than that shown in FIG. 2. Using the same processing scheme as for FIG. 2, that is, more than 50% of the character within a picture element produces a full print dot, the character shown in the fine level scanner 50 of FIG. 3 produces the character shown in a fine level printer 52. The staircasing effect of the fine level scan and print is hardly noticeable, since the eye of the observer tends to blend the rough edges. This character is not objectionable and, in fact, is preferred. However, the tradeoff is such that the fine scan requires that a large amount of digital information be transmitted, even though known compression processing schemes are used. The fine scan/fine print scheme of the prior art produces a pleasant character reproduction at the expense of a costly data transmission.

Figure 4A:
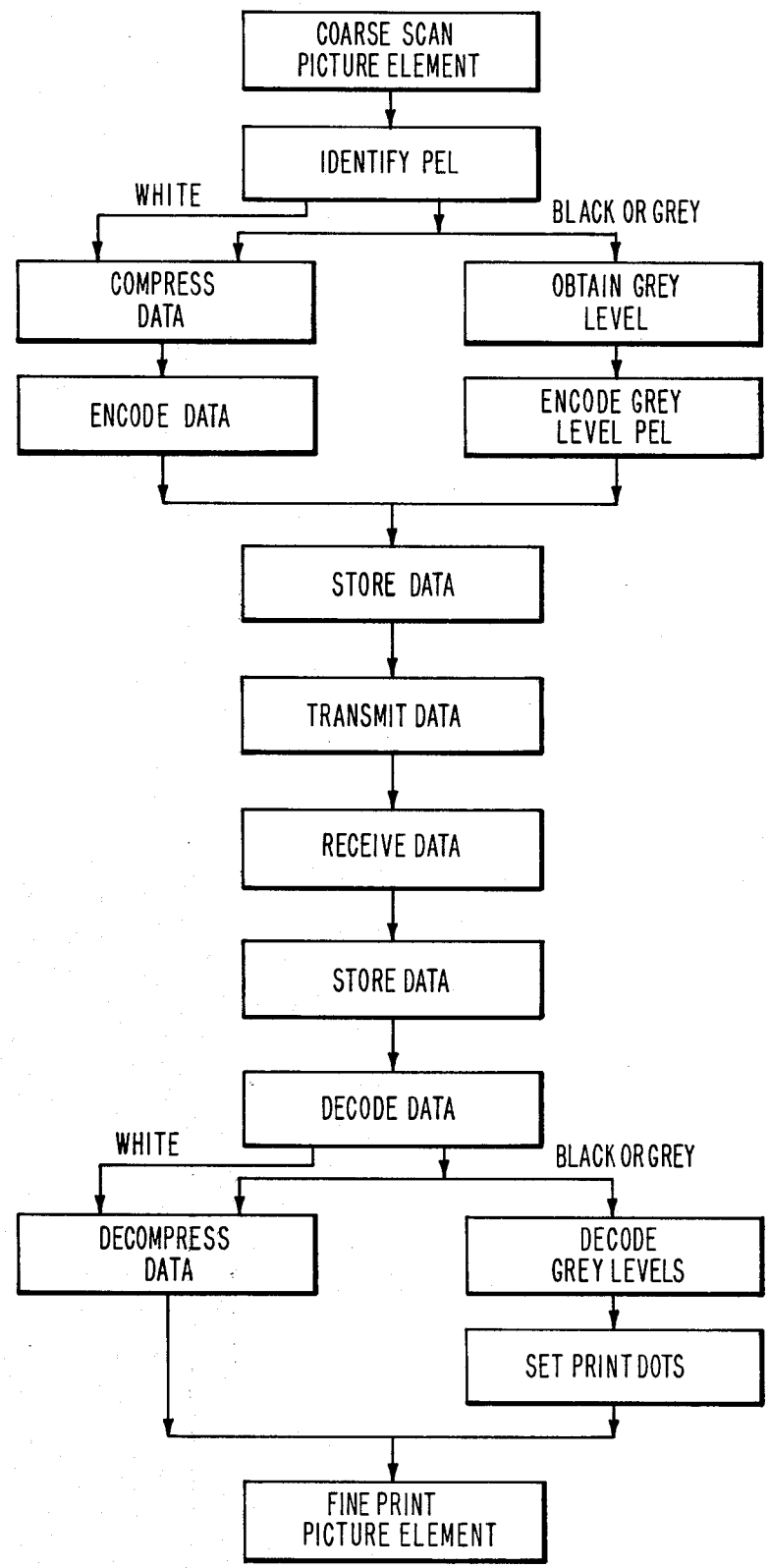
FIG. 4A illustrates method steps of a coarse scan to fine print process according to the present invention as shown in FIG. 1.

To lower the resolution requirement without sacrificing print quality, the advantages of the coarsely scanned character of FIG. 2 is combined with the advantages of the fine printing as shown in FIG. 3. The coarse scanning produces a less amount of digital information that must be transmitted while the fine print produces an acceptable character without an unpleasant staircasing effect of FIG. 2. To accomplish this apparent inconsistency between the coarse scan and fine print, the unique process identified in the flow diagram of FIG. 4A is used. Broadly stated, the character is coarsely scanned wherein coarse picture elements are identified according to white and grey levels. In one embodiment (FIG. 5A), only white information is encoded according to the well known run length encoding. Any picture element containing a portion of the character is encoded according to the percentage of the picture element covered by that portion of the character.

In a second embodiment (FIG. 5B) both white and all black levels are run length encoded and thus only the edge or partial black levels are grey scale encoded. In these embodiments, the fine print includes sixteen print dots for each of the coarsely scanned picture elements with no dots representing all white. Thus, for each coarsely scanned picture element including at least a portion of the character, a grey level of from 0 to 15 is binarily encoded. The entire character representation according to the background and grey scale is stored for transmission. The received encoded information is decoded and decompressed according to the fine printing requirements. That is, the white information is decoded according to the run length encoding while the black character picture elements are decoded according to the grey level or all black binary encoding. The print dot matrix of the fine print is activated according to the information decoded from the grey level scale. As will be disclosed later, to better distribute the print dot, a special unique process is used, a single directional bias scheme, that uses the surrounding coarsely scanned background and character information to weigh the print dot toward the picture element that includes some portion of the character. The fine level reproduction as shown in FIG. 1 is the result of this scheme. Favorable comparison can be made with the fine level reproduction as shown in FIG. 1 with that resulting from the fine scan and fine print character as disclosed in FIG. 3.

Referring to FIG. 4A, the process starts by coarsely scanning a picture element (PEL). The picture element is next identified as to whether it is a portion of the background or of the character to be reproduced itself. If the picture element is identified as a portion of the character to be identified by its grey level, the next process step is obtaining the grey level according to the percentage of the picture element that is covered by the portion of the character. The identification of the picture element as a grey level of the character is binarily encoded and stored if desired.

If the pel identified is one that is not to be grey scale encoded, all white or all black for instance, this data is suitably compressed as shown in the process step block after the IDENTIFY PEL step where the step is to COMPRESS DATA. The next process step is to suitably encode the compressed data and then to store the data, again if desired. The scanning procedure ends when the last picture element is coarsely scanned and the binary information is ready for transmission to the reproduction device as shown in FIG. 1. The data information is directed to the receive controller and on to the decompression processor where it is decoded and decompressed for reproduction according to the process continuing in FIG. 4A.

The transmitted data information is received in the next process step and directed to a storage device. The data information transmitted is decoded to identify the background information and the character information. This information together with the run length encoding information and the grey level data for the character information make up the byte which is the plurality of bits that together form a particular information group. In the process chart of FIG. 4A, the next operation is to identify the byte as to whether it identifies a background picture element or a character picture element.

If the byte is a run length encoded picture element, the process continues to decompress the run length encoding which in turn identifies the number of picture elements that are located in a sequence. The picture elements are reproduced effectively by activating the print process. The all black and all white pels are reproduced by treating the fine level reproducer as though it were a coarse level reproducer, that is, one white pel in the present embodiment will deactivate a 4×4 matrix in the fine level reproducer and one black pel will activate all of the print dots in a matrix.

If the byte decoded in the decode data step identifies a character picture element having grey levels, the process branches to decode the grey level information from the remaining bits of the byte. The dot printing is selected according to the grey level information retrieved. The process continues to bias the dots according to a single directional scheme according to a preferred embodiment such that the fine printing is enhanced by selectively loading the most dots towards the surrounding elements that contained prints of the character. The process steps for this print method is shown in FIG. 4B.

Figure 4B:
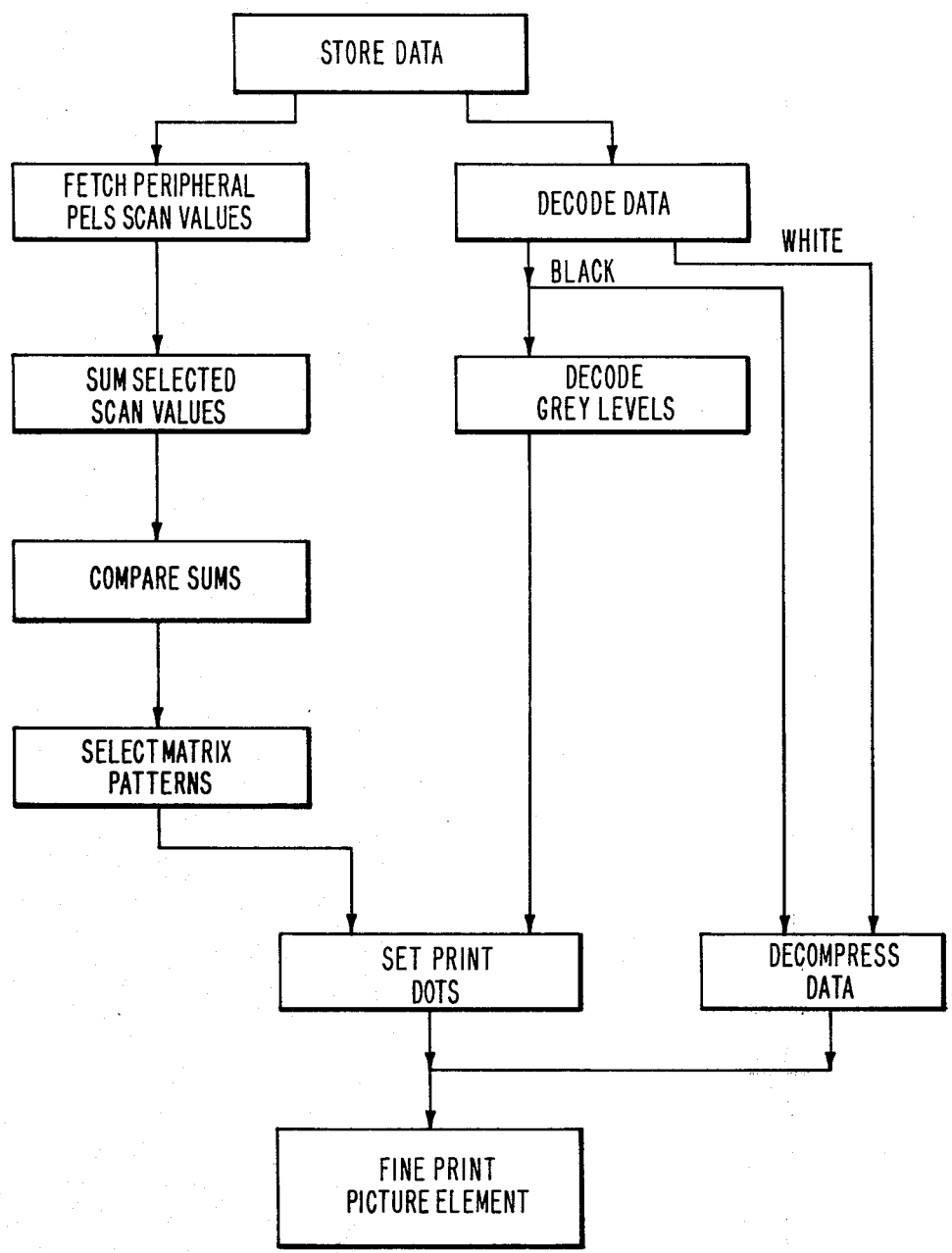
FIG. 4B illustrates method steps for dot placement of a printer usable with the process steps of FIG. 4A.

In FIG. 4B, the process steps for a dot biasing scheme is shown. The print dots set as per the process steps of FIG. 4A are biased towards the character in an efficient manner. After the store data process step of FIG. 4A, the data information is decoded as stated to then decompress the compressed data and to separate the grey level values. The grey level values are decoded as per the process of FIG. 4A. According to the single directional biasing scheme though, the process steps further include another step of retrieving or fetching the scan values of pels peripheral to the pel being reproduced. The next step is to sum or add the scan values from the top and bottom horizontal, the right and left side vertical and the corner positions for groups of three of the peripheral pels, and then comparing these sums to find the highest sum. Then the next process step is to select a matrix pattern that biases the dot print according to preselected positions determined by the pattern that most closely resembles the print necessary for the highest sum position. The print dots are set accordingly in the next process step as before and the picture element is fine printed in the last process steps as also discussed in FIG. 4A.

It should be obvious that the coarse scanned picture element can also be directly connected to a fine reproduction device without using the advantages of the data compression technique disclosed. For instance, the grey levels and the white picture elements can drive the fine print device without encoding. The white picture elements can inactivate the matrix print and the grey level values can control the number of dots printed. The necessary process steps are to coarse scan the picture element, identify the picture element as to white or grey levels including all black, set the print dots according to grey level, and print according to the set print dots and the white picture element information. The print dots may be set according to the process disclosed in FIG. 4B to bias the dots according to that scheme. This process, of course, does not take advantage of the compression encoding scheme disclosed and its accompanying advantage to long distance transmission, that is, a fine reproduction capability with lower data transmission than previously known.

The objective of the present invention is to reduce the resolution requirements of scanning such that the number of bits to be transmitted can be reduced while keeping the printing resolution as accurate to the original character as possible. Lower scanning resolution means that a lesser number of scanner elements is required permitting the use of a lower power illumination light source due to the increase in the aperture area. The memory area for storing the character does not need to be as large with a lower scanning resolution. The advantages of the coarse scan/fine print together with the improved process for better identifying the position of the fine print picture element can be better described by referring to FIGS. 5-13.

Figure 5A:
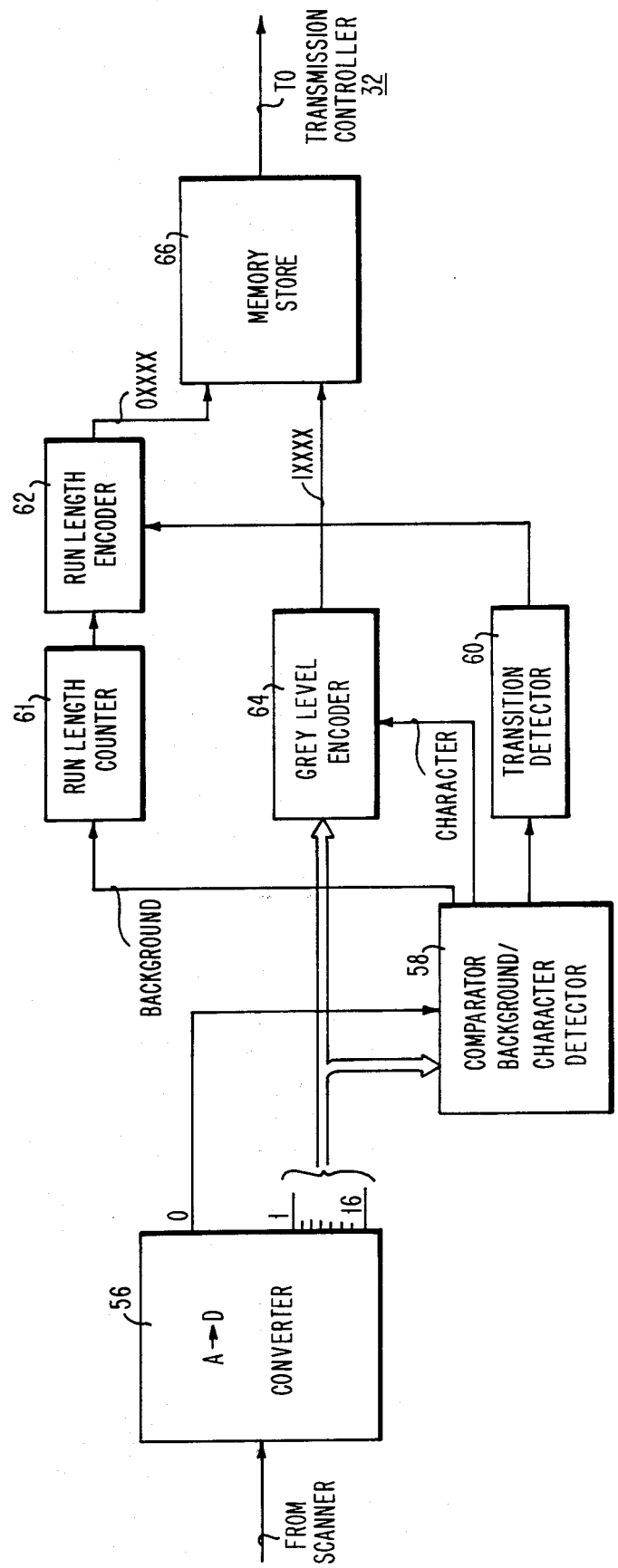
FIGS. 5A and 5B are block diagrams of different embodiments usable as the compression processor of FIG. 1.
Figure 5B:
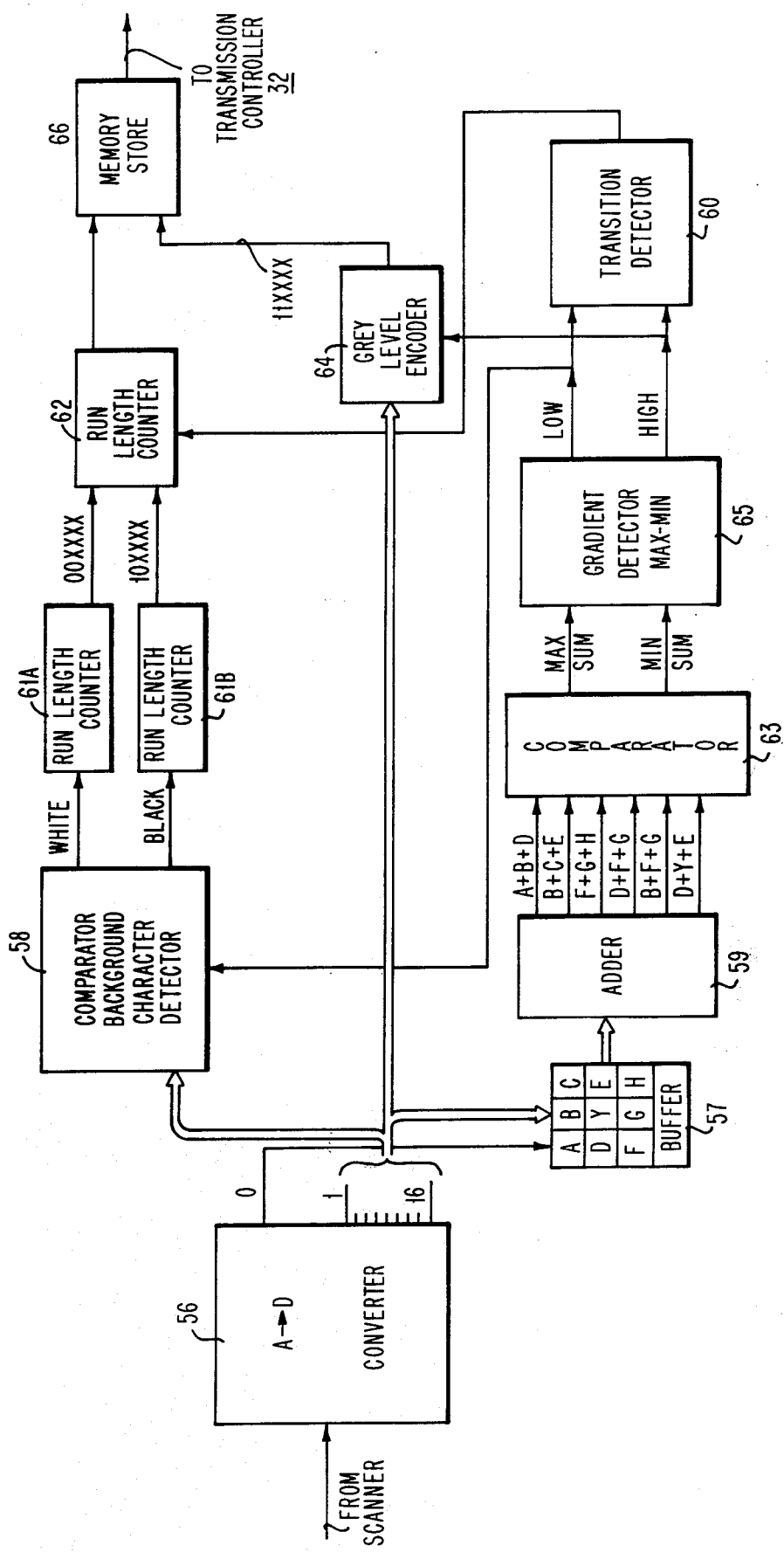
Figures 6A, 6B:
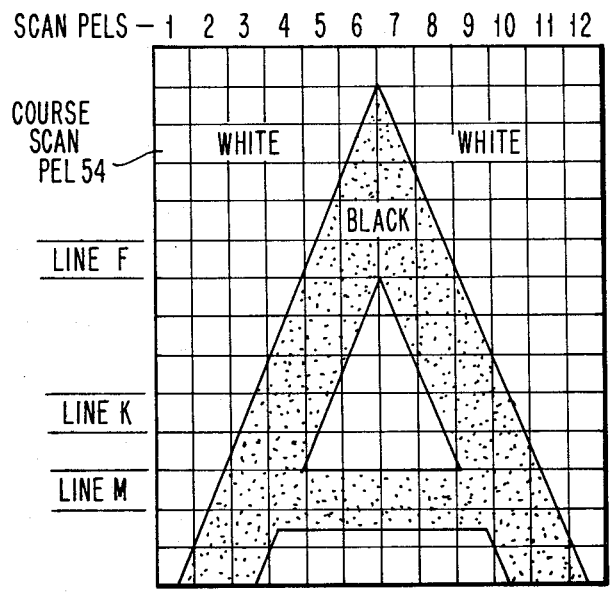
FIGS. 6A and 6B illustrate the compression scheme according to an embodiment of the present invention on a letter "A"

In the data compression scheme for scanning black and white documents, for instance, one embodiment disclosed uses run length code for the background (white) information and grey level values for the stroke of the characters (black) in the document. A byte thus contains the information identifying the background and also identifying the length of the run length code for the number of background picture elements in the code. A byte identified as containing character stroke information has further bits representing the grey level information of the picture element. The data compression scheme of this embodiment can best be described by referring to FIGS. 5A, 6A and 6B. In FIG. 6A, a character "A" is shown with each square representing a coarsely scanned pel 54. The fine print of the preferred embodiment and that which will be discussed is a printer which is capable of printing sixteen dots in a square four dot by four dot matrix for each coarse scan pel 54. The required bits to activate the sixteen print dots are obtained in the decompression processor 38 of FIG. 1. A more detailed block diagram of one type of decompression processor 38 is shown in FIG. 5A. A block diagram of a more efficient compression scheme with a second type of decompression processor 38 is shown in FIG. 5B.

Referring to FIG. 5A, when the character is being scanned, the amplitude analog signal is digitized in an analog to digital converter 56 into sixteen grey values with 1 being the lowest grey value and 16 representing a completely black value. The header bit of each byte identifies whether the byte will be a background information and thus the next bits are run length information, or a character picture element and thus the remaining bits in the byte are grey value information. For the present embodiment an "0" in the header bit represents the background information and the next four bits of the byte are therefore run length information. A "1" as the header bit, identifies the byte as containing character bits information and the next four bits of the total byte contain the grey value information.

In FIG. 5A, the compression processor 30 comprises the Analog to Digital Converter 56, a comparator background/character detector 58, a transition detector 60, a run length counter 61, a run length encoder 62, a grey level encoder 64, and a memory store 66. The A-D Converter 56 accepts the analog signal from the scanner 18 and converts the signal into either an all white or background signal, or a grey level or character information signal. The background signal is directed to the run length counter 61 for counting the number of white pels until a character information is sensed. The detector 58 and the transition detector 60 senses the change from all white picture elements at which time the number of background picture elements are known and the background byte 0XXXX can be encoded in the run lengths encoder 62. The transition detector 60 can be a flip-flop circuit that senses the change from white to grey or vice versa. The "0" header bit signifies that this byte contains background information while the remaining bits define the binary number of background or white picture elements in a sequence. The character information is scaled on a 1-16 grey scale in the analog to digital converter 56 and directed to the grey level encoder 64. The grey level encoder 64 produces a byte of 1XXXX where the "1" header bit signifies that this byte contains character information. The remaining bits are binarily encoded to represent the digital grey scale. The grey level encoder 64 is activated by the sensing of a character by the comparator detector 58.

The binary encoded background and character information bits are stored generally in serial fashion in the memory store 66 for ease of serial transmission when the transmission controller 32 is activated, which in turn activates the retrieval of information from the memory store 66. For an example of the encoding and compression scheme of FIG. 5A, reference is made to FIG. 6A where the letter A is illustrated in black on a white background. Each square represents the coarse scan pel 54. Twelve scan pels are located in each scan line or row. Fifteen scan lines are used to cover a single character line. FIG. 6B is a chart showing the identification of lines F and K for the twelve scan pels. The "0" in the line identifies a white sensed pel and the "1" identifies a black sensed pel with the number in the parenthesis identifying the grey level on a 1–16 scale.

In FIG. 6A, at line F, scan pels 1, 4 and 10–12 all represent background or white picture elements. Scan pels 5–9 represent varied amounts of grey bit information. For the original background run length byte, the binary information bit will be represented as 00011 with the first 0 bit identifying the byte as containing background information and the binary encoded 3 identifying that 3 more picture elements are also representative of the background. The next byte could be encoded 11011 representing the fifth block of information. The "1" header bit identifies the byte as containing character information and the binary encoded eleven of the next four bits identifies the grey level of twelve as shown in FIG. 6B. For encoding, the grey level values of 1–16 are represented in binary encoding as 0–15 or 0000 to 1111. Scanning pels 6 and 7 of line F are all black, grey level of sixteen, and are, therefore, characterized by the encoding of 11111. Scan pel 8 of line F can be characterized as having a grey level of twelve and is characterized by the byte 11011. Scan pel 9 can be characterized by a character representation having a grey level of one since only one small corner is covered by the character and therefore this pel has the binary representation of its byte as 10000. The remaining pels 10–12 include white or background information and therefore will include a run length coding of 00010 to identify that the picture elements are background and the initial pel is followed by two white pels in the run length code. Thus, for line K in FIG. 6A as charted in FIG. 6B, the scanning blocks 1, 2, 6, 7, 11, and 12 include only background information and therefore the header bit will be encoded as a '0' followed by its run length coding. Scanning blocks 4 and 9 have a grey value of sixteen representing all black and scanning blocks 3, 5, 8, and 10 have intermediate grey values from 0–16. Using the intermediate grey values as set out in the chart of FIG. 6B, for line K a block of data having 9 bytes is transmitted as follows: (00001), (10111), (11111), (10111), (00001), (10111), (11111), (11001), (00001). This message block along with the other line message blocks make up the binary information stored in the memory store 66 of FIG. 5A for later transmission out of the transmit controller 32 of FIG. 1 to the receive controller 36. When this compressed data is received, the decompression processor 38 reconstructs the character according to the fine print level reproduction in a resolution that is four by four times finer than the scan block with a coarse print. There are 12×15 scan pels in FIG. 6A. This is expanded to a 48×60 print pels or fine print dots.

The run length encoding scheme of FIG. 5A provides a compression of data information but it should be obvious that too much unnecessary grey level information is transmitted for all black, for instance. In line M, a run length of all black would greatly decrease the data transmitted. The only grey level values necessary for best reproduction are the character edge grey levels. Thus, a second embodiment is shown in FIG. 5B for a compression processor 30 of FIG. 1.

Referring to FIG. 5B, the compression processor 30 includes the analog to digital converter 56, a three line buffer 57, the comparator background/character detector 58, an adder 59, the transition detector 60, a run length counter 61A for white, a run length counter 61B for all black, the run length encoder 62, a comparator 63, the grey level encoder 64, a gradient detector 65, and the memory store 66. As with the embodiment of FIG. 5A, the scanned pel signals are directed to the analog to digital convertor 56 where the analog signals from the scanner are digitized with 0 representing white, 16 representing all black, and 1–15 representing grey level values. The output signals from the analog to digital converter 56 are directed to the comparator detector 58 where the characteristic of the picture element is determined. Since an otherwise all white or all black pel may erroneously contain a speck of black or white, the pel Y being encoded is first compared to the surrounding pels.

The digital information of surrounding pels A–H are placed into the three line buffer 57 along with the pel Y being encoded according to the pattern shown. The information from the buffer 57 is directed to the adder 59 where six sums are obtained as shown on the outputs from the adder 59 to the comparator 63. The comparator 63 obtains the maximum sum and the minimum sum from the sum outputs from adder 59. These signals are directed to the gradient detector 65 where the minimum sum is subtracted from the maximum sum. If the output from the gradient detector 65 is low, that is, below a set value signifying that surrounding pels have essentially the same value whether white or black, the comparator detector 58 is activated to count the pel in the appropriate run length counter. If the output from the gradient detector 65 is high, signifying a large contrast, the grey level encoder 64 is activated and the grey level values are suitably encoded. The transition detector 60 detects a change from white to black or vice versa to activate the run length encoder 62. The run length encoder 62 suitably encodes the data information for storage in the memory store 66 together with the directly stored grey level values from the grey level encoder 64. The output signals from the memory store 66 are directed to the transmission controller 32 of FIG. 1 as required.

For the embodiment of FIG. 5B, a run length byte of 00XXXX with header bits of 00 can signify an encoding of white pels, again with the binary numbers XXXX signifying the length of successive white pels. A run length byte of 10XXXX can signify a run length encoding of all black pels, again with the binary numbers XXXX signifying the length of successive black pels. The grey level values can then be encoded as 11XXXX with the header bits of 11 signifying a grey level and the remaining bits of the byte binarily encoding the grey level values. Thus, the line F of FIG. 6A would be encoded 000011 for the first four pels, 111011 for the scan pel 5, 100001 for the scan pel 6 and 7 which are all black, 111011 for the grey level value of scan pel 8, 110000 for the grey level value of scan pel 9, and 000010 for the run length encoding of all white pels 10, 11 and 12. The number of bits encoded are not significantly different from the embodiment of FIG. 5A but would be much less when line M is encoded. For the embodiment of FIG. 5A, all pels would be individually encoded since no white run lengths are encountered. For the embodiment of FIG. 5B, the pels 3 to 10 would be run length encoded as 100111 and not individually.

Figure 8:
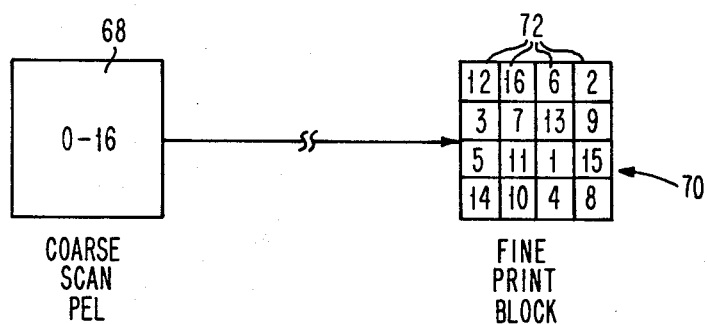
FIG. 8 shows a single scan pel for a coarse scan to a fine print block showing the dot print according to an embodiment of the present invention.
Figure 9:
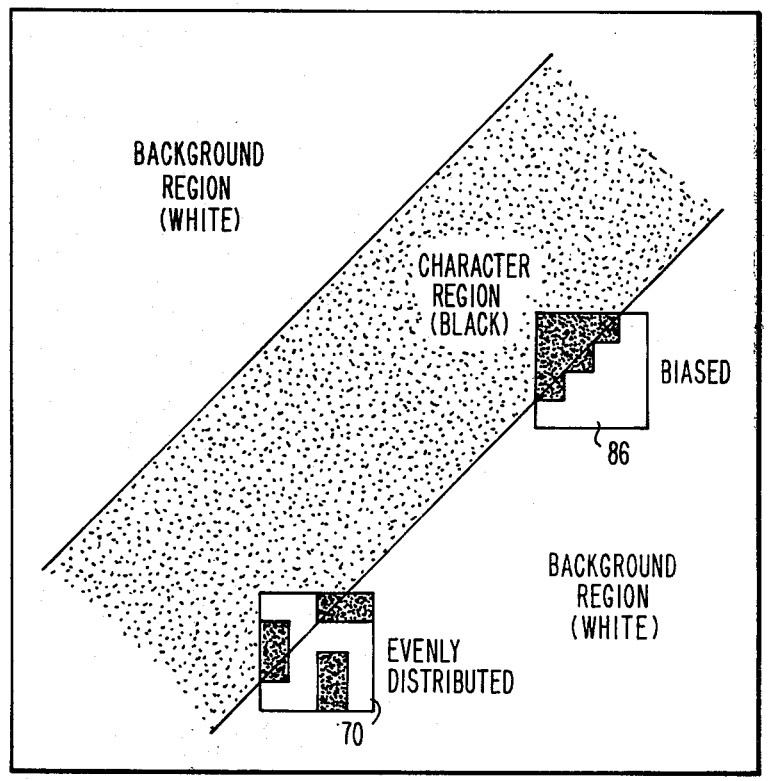
FIG. 9 shows the print distribution according to a bias scheme and an evenly distributed scheme for a conversion from the coarse scan to fine print of the present invention.

The present invention uses the analog output of the scanner divided into a finer grey scale value to accomplish the expansion of the data that is required to drive a higher resolution device. A coarse scan pel 68, see FIG. 8, provides a white signal output '0' as well as sixteen grey levels. This is expanded by activating the sixteen dots of a print matrix accordingly. In FIG. 8, a fine print block 70 contains print dots 72 shown in a random rating position where all dots at or below the grey level signal are activated. Thus, for a grey level of 6 out of a 1–16 rating, print dots 1 through 6 are activated. The resulting fine print block 70 is shown in FIG. 9 under the label of an evenly distributed dot placement scheme. A better scheme for placing the dots under a single directional biasing scheme will be disclosed later. The operation of the process steps of FIG. 4B and the receive process steps of FIG. 4A is described in the block diagrams of FIG. 7 showing the decompression processor 38 of FIG. 1.

Figure 7:
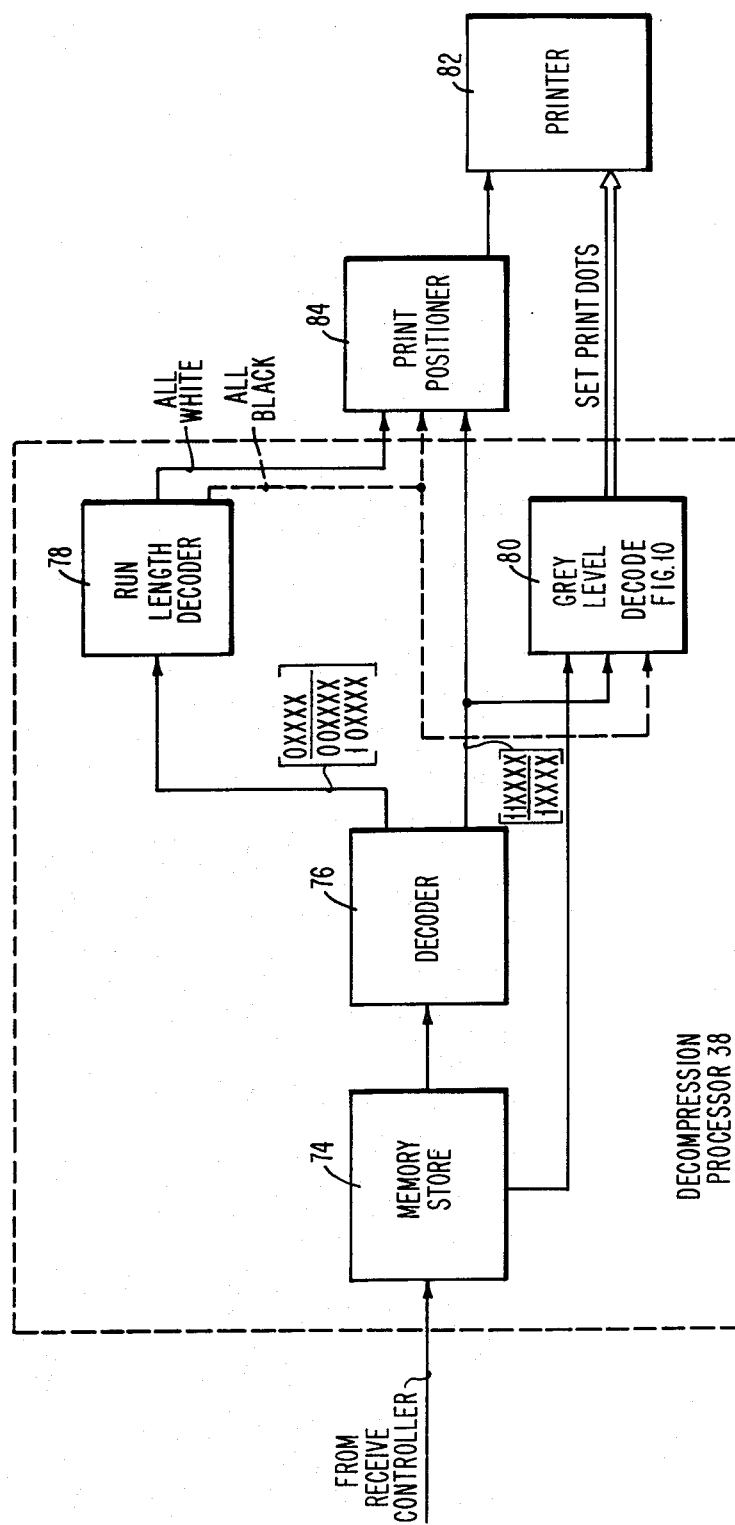
FIG. 7 is a block diagram of the decompression processor of FIG. 1.

Referring to FIG. 7, the data information signals received by the receive controller 36 are directed to a memory store 74 in the decompression processor 38. The stored information is decoded as to background and character information in a decoder 76. The run length signal information is directed to a run length decoder 78 while the grey level signal information is directed to a grey level decoder 80. The grey level decoder sends a set print dots signal to a printer 82, the fine level reproducer 40 of FIG. 1. The output signals from the run length decoder 78 and the grey level signal from the decoder 76 are directed to a print positioner 84 which controls the scanning and spacing operation of the printer 82. The run length grey level signals control the printing placement while the set print dots signals control the dots that are activated to print a part of the character in the printer 82.

The run length signals from the decoder 76 are labeled [0XXXX and 00XXXX, 11XXXX] to signify the output signals from both compression embodiments of FIG. 5A and 5B. Likewise the grey level signals [1XXXX and 11XXX] are the signals from both embodiments of the decoder 76. The solid signal lines denote signal direction for the embodiment of FIG. 5A while the dotted lines for the all black signals are added for the embodiment of FIG. 5B.

It should be understood that the printer 82 of the present embodiment produces four print dots in each column of scan pels as well as four lines of print dots in each scan line. A scanning printer, akin to a CRT line scan, would require four scans to complete one line of scan pel information. The individual dots of each scan line can be turned on and off according to the even distribution scheme as shown in FIGS. 8 and 9 according to the grey level information received. Of course, on white scan pels, all fine print dots in that identified 4×4 matrix are not activated. In a character or line dot printing scheme, all print and no print dots are set into position accordingly either by a prescan or by a parallel data transfer from a buffer unit (not shown) to the printer 82. The particular printer scheme need not be more fully described here as many substitutions can be made within the skill of one knowledgeable in the art.

In FIG. 9 is shown the effect of different print matrix placement on the fine printing. Using the even distribution scheme for instance, the print block 70 receiving a grey character information on a scale of 6 will have the print dots randomly placed as shown. The random distribution is taken according to that shown in FIG. 8. However, if a biased scheme is used, such that the placement of the black dot can be distributed according to a scheme wherein the print dots are biased towards the character region, a placement of the print dots as shown in a biased print block 86 of FIG. 9 occurs. The differences in the resulting character print between the two is quite evident. The use of the bias scheme would give a much better reproduction of the original character.

For a scan element to be printed on the edge of a character stroke, it would be advantageous to activate print dots in the section that corresponds to the black region inside the stroke character. Using the evenly distributed placement scheme of FIG. 8, a number of dots will be placed in the background white region outside the character stroke. These print dots, protruding from the normal character stroke boundaries, produce a hazy print. Since characters normally have sharp boundaries, information from neighboring scan elements could be used to bias the printing dots toward the dark side of the surrounding coarse scanned elements. The print dot biasing method proposed can be considered as a non-linear interpolation scheme. A linear interpolation scheme is a widely used method in curve fitting and statistical analysis of data.

Figure 10:
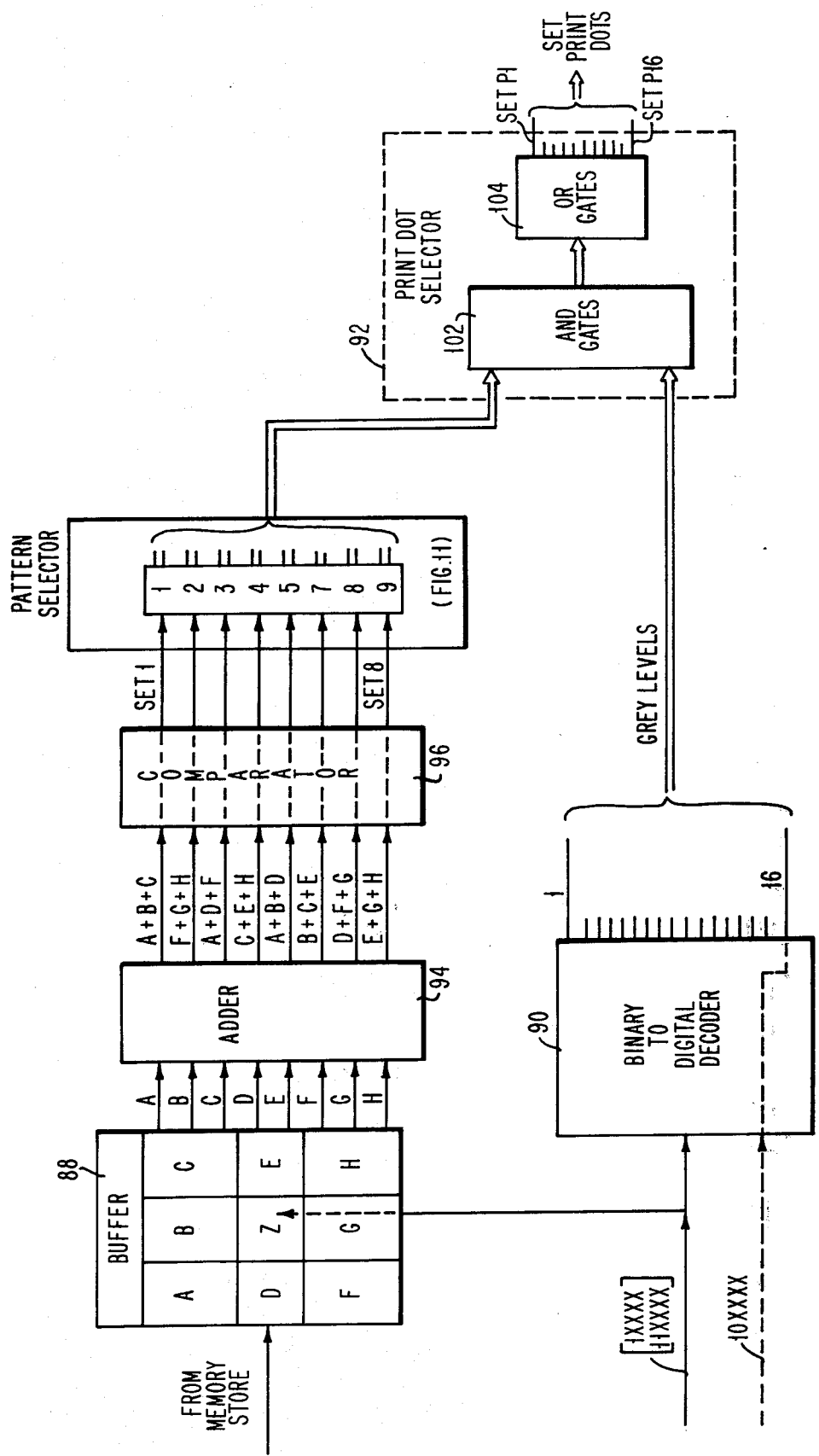
FIG. 10 is a block diagram of a preferred embodiment of a grey scale decoder as shown in FIG. 7.

In order to use a print dot biasing scheme, an assumption has to be made about the character stroke width in relation to the scan aperture size. To detect the surrounding darkness or grey pattern, the eight surrounding scan picture elements of the scan pel Z under observation are examined, see FIG. 10, to bias the dots in the scan area to be printed. The actual number of dots printed is determined by the grey level value of the scan element being processed. The grey level values of various groups of three scan pels are added to form a sum. There are eight sums corresponding to eight possibilities of dot biasing. The eight sums correspond to eight patterns located symmetrically on both sides of four bisecting lines of the scan pel, namely vertical, horizontal, and two intersecting 45° lines. For each pattern sum, there is a threshold matrix associated with it that determines the dot placement when printing. A particular threshold matrix corresponding to the largest value of the pattern sum among the eight possible cases is selected to print the dots in the scan pel. It should be noted that the dots in each matrix are designed to be strongly biased toward the direction of the associated pattern. The effect of the single directional biasing scheme results in a print quality with excellent restructuring of the original character. The single directional biasing method can be easily implemented requiring several logic components and some memory store for the threshold matrices. FIG. 10 illustrates a block diagram for implementing the single directional biasing scheme of the invention.

Referring to FIG. 10, for the single directional biasing scheme, the grey level decoder 80 of FIG. 7 includes a three line buffer store 88 to hold the scan pel Z under examination and the surrounding scan pels A–H as shown. A binary to digital decoder 90 decodes the binary character byte 1XXXX or 11XXXX to a 1–16 grey level scale for the selection of the print dots by a print dot selector 92.

The grey level decoder 80 also includes an adder 94 for summing specific grey level information from the surrounding scan pels according to selected patterns, a comparator 96 for selecting the highest pattern sum of the specified scan pels, and a pattern selector 98 to alter the activation of the print dot selector 92 according to the highest pattern sum. The eight patterns of the preferred embodiment as produced by the pattern selector 92 are shown in FIG. 11 and will be described later.

The buffer 88 and adder 94 combine to select specific patterns biased in that the lower print dot numbers are prepositioned towards selected areas. Thus, the A+B+C output from the adder 94, if the highest sum as determined by the comparator 96, activates the SET 1 output and biases the print dots resulting from the scan pel Z to the top of the print block resulting from this scan pel. FIG. 11 shows the print dot placement in block 100 with the lower number print dots placed closer to the top vertical position. The lower number of the print dot means that that print dot will be activated by a lower grey level value. The general scheme for printing in the present embodiment is that all print dots at and below a grey level value are activated by the value. Thus, all sixteen dots are activated by a grey level value equal to sixteen.

Figure 11:
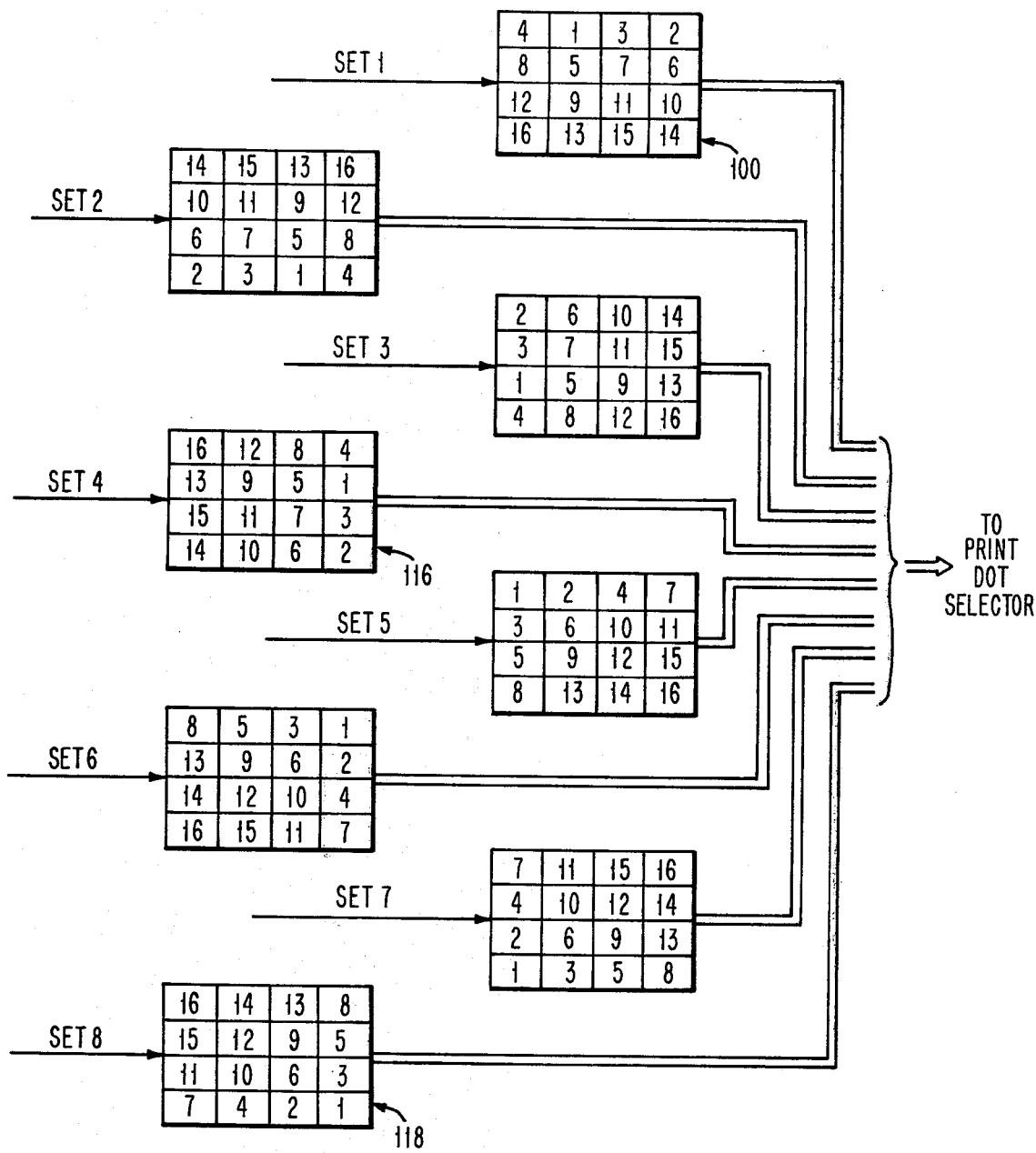
FIG. 11 shows representative bias dot placement according to a bias scheme using single directional biasing with different horizontal and vertical patterns for the pattern selector of FIG. 10.

In FIG. 11, the print dot placement as shown can comprise a block of data stored in a read-only store memory. The patterns are permanently or semi-permanently placed in the elements of the read-only store and signals are retrieved according to the stored print dot placement when the read only store is activated by a SET signal from the comparator 96.

Figures 12, 13:
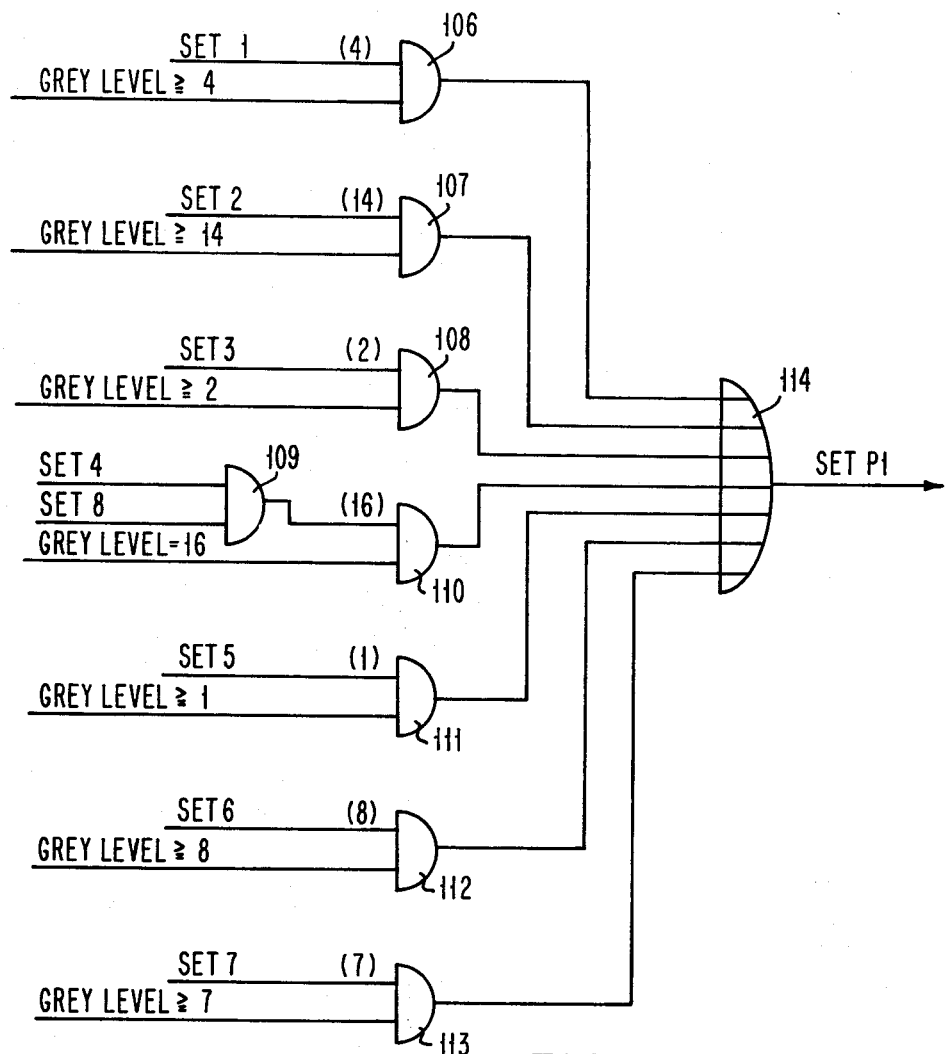
FIG. 12 shows a logic circuit usable to drive one print dot as part of the print dot selector of FIG. 10.
FIG. 13 illustrates a possible print dot placement scheme for use with the pattern selector of FIG. 11.

Correspondingly, it can be shown that each pattern selection according to the SET output signals from the comparator 96 determines the biasing of the print dots either vertically to either side, horizontally to either top or bottom, or towards any one of the four corners. The adder 94 in FIG. 10 combines the digital scan value information of each scan pel of the buffer 88 as shown in the output signals from the adder 94. The comparator 96 selects the highest pattern sum and activates one pattern block of the pattern selector 98 shown in FIG. 11. The pattern selector 98 activates the print dot selector 92 according to a set of AND-gates 102 and OR-gates 104. The print dot selector 92 activates the print dots P1–P16 according to the pattern selected and the grey level signals. A representative logical circuitry for accomplishing the activation of one print dot P1 is shown in FIG. 12. The separate print dots P1–P16 can be placed in accordance with FIG. 13.

Referring to FIG. 12, a series of logical gates 106 to 114 comprise the apparatus that could be used to activate print dot P1 of the entire print block of FIG. 13 which corresponds to one scan pel. Print dot P1 is the top-left most dot and therefore can print the grey level dots as shown in the similar position in the patterns shown in FIG. 11. For instance, if a SET 1 signal is received from the comparator 96, the AND-gate 106 is activated if the grey level signal from the binary to digital decoder 90 is equal to or greater than 4. The output of the AND-gate 106 activates the OR-gate 114 which in turn activates the SET P1 signal to activate the P1 print dot.

Likewise, the other SET 2–8 signals activate respective AND-gates according to grey levels. AND-gate 110, for instance, is activated only by a grey level of 16 either when a SET 4 or a SET 8 signal is activated as directed to the OR-gate 109 whose output controls one leg of the AND-gate 110. The patterns 116 and 118 in FIG. 11 show that with either an activated SET 4 or SET 8 signal, only a grey level scale of 16 will activate the top-left most print dot, print dot P1. The various other print dots can be similarly, logically activated by using the pattern selection of FIG. 11 and the representative logical devices and apparatus of FIGS. 10 and 12.

Single directional biasing, that is, selecting a fixed threshold matrix which is strongly biased toward the darkest surrounding pattern produces a print output comparable in quality to that of fine scanning and fine printing from a coarse scan and fine printing reproduction device. A high quality copy of original text can be configured using a large scan aperture of, for instance, 180 pel/inch and a fine dot printing device of, for instance, 720 pel/inch. The large scanning aperture would result in lessening the number of picture elements produced by a scanning operation and, therefore, provides a decrease in the light illumination power and the size of the storage buffer for the transmit and receive processing functions. Likewise the time required to transmit the lower number of bits of information is decreased since the number of scan elements are substantially decreased. Yet, the reproduction quality does not suffer substantially even with the coarse scanning methods being used.

The principles of the present invention have now been made clear in an illustrative embodiment. There will be immediately obvious to those skilled in the art, many modifications of structure, arrangement, proportions, the elements, materials and components used in the practice of the invention. For instance, the block diagrams of the preferred embodiments are representative of various assemblies such as large scale integration circuits, scanning and reproduction devices usable according to the methods proposed and advocated in the present invention. Different reproduction matrices can be envisioned. Lower resolution such as 2×2 or higher resolution such as 8×8 with using six binary bits of information for 64 grey level scales is possible. The appended claims are, therefore, intended to cover and embrace any such modification, within the limits only of the true spirit and scope of the invention.

What is claimed is:

1. A process for the reproduction of a scanned picture element of a picture comprising the steps of:
    coarsely scanning a picture element of the picture;
    identifying the coarsely scanned picture element according to a numerical level value from white to grey to black, where the numerical level of grey to black is equal to from 1 to N;
    compressing common level picture elements identified;
    encoding the compressed common level picture elements;
    encoding the numerical level of at least grey scaled picture elements;
    decoding the received picture elements to separate the compressed picture elements from the grey level encoded picture elements;
    decompressing the compressed picture elements;
    decoding the grey level encoded picture elements; and setting the reproducing dots in a fine reproducer where a coarsely scanned picture element is reproduced in an A×B size matrix of reproducing dots accordingly, where a white picture element activates no reproducing dots and a grey picture element activates the number of reproducing dots in the matrix according to its numerical value from 1 to N, where the product of A×B is equal to N.

2. A process as defined in claim 1 wherein the numerical level of grey to white is equal to from 1 to N where a black picture element activates no reproducing dots and a grey to white picture element activates the number of reproducing dots accordingly.

3. A process as defined in claim 1 wherein the step of setting the reproducing dots controls the placement of dots of ink in an ink jet printer.

4. A process as defined in claim 1 wherein the step of setting the reproducing dots is accomplished according to a biasing scheme where the position of individual dots are placed according to the picture scanned.

5. A process as defined in claim 1 wherein the step of encoding the common level picture elements identified is done by a run length encoding scheme.

6. A process for the fine level reproduction of a coarsely scanned picture element comprising the steps of:
   identifying the coarsely scanned picture element according to a numerical level value from white to grey to black, where the numerical level of grey to black is equal to from 1 to N;
   compressing common level picture elements identified;
   encoding the compressed common level picture elements;
   encoding the numerical level of at least grey scaled picture elements into binary form;
   transmitting the encoded picture elements;
   receiving the transmitted picture elements;
   decoding the received picture elements to separate the compressed picture elements from the grey level encoded picture elements;
   decompressing the compressed picture elements;
   decoding the grey level encoded picture elements;
   setting the number of reproducing dots in the fine level reproducer according to the grey level value data where the coarsely scanned picture element is reproduced in a A×B size matrix of reproducing dots and where a white picture element activates no reproducing dots and a grey to black picture element activates the number of reproducing dots in the matrix according to its numerical value from 1 to N, where the product of A×B is equal to N.

7. A process as defined in claim 6 wherein the numerical level of grey to white is equal to from 1 to N where a black picture element activates no reproducing dots and a grey to white picture element activates the number of reproducing dots accordingly.

8. A process as defined in claim 6 wherein the step of setting the reproducing dots controls the placement of dots of ink in an ink jet printer.

9. A process as defined in claim 6 wherein the step of setting the reproducing dots is accomplished according to a biasing scheme where the position of individual dots are placed according to the picture scanned.

10. A process as defined in claim 6 wherein the process of compressing common level picture elements run length encodes the white or background picture elements and the decompressing process step decompresses this run length encoding.

11. A process as defined in claim 6 wherein the process of compressing common level picture elements run length encodes the white or background picture elements and the all black or all character picture elements and the step of encoding the numerical level of at least the grey scaled picture elements encodes the edge of the background/character.

12. A process for the fine level reproduction of a coarsely scanned picture comprising the steps of:
   coarsely scanning a picture element of the picture;
   identifying the coarsely scanned picture element according to a level value from white to grey to black;
   compressing common level picture elements identified;
   encoding the compressed common level picture elements;
   obtaining a grey level value for picture elements identified by at least the change of level values from surrounding picture elements;
   encoding the obtained grey level values into binary form;
   transmitting the encoded compressed picture elements and grey level value picture elements;
   receiving the transmitted picture elements
   decoding the received data to separate the compressed data and the grey level value data;
   decompressing the compressed data;
   decoding the grey level value data;
   setting the number of reproducing dots according to the grey level value data; and
   reproducing the picture according to the decompressed data and the reproducing dots set.

13. A process as defined in claim 12 wherein the process of compressing common level picture elements run length encodes the white or background picture elements and the decompressing process step decompresses this run length encoding.

14. A process as defined in claim 12 wherein the process of compressing common level picture elements run length encodes the white or background picture elements and the all black or all character picture elements and the step of encoding the numerical level of at least the grey scaled picture elements encodes the edge of the background/character.

15. A process as defined in claim 12 further including a step of storing the encoded compressed picture elements and grey level value picture elements prior to the step of transmitting.

16. A process as defined in claim 12 further including a step of storing the received picture elements prior to the step of decoding the received data.

* * * * *